United States Patent
Singh et al.

(10) Patent No.: US 10,262,297 B1
(45) Date of Patent: Apr. 16, 2019

(54) PART CHAIN MANAGEMENT IN AN AFTERMARKET SERVICES INDUSTRY

(71) Applicant: Entercoms, Inc., Irving, TX (US)

(72) Inventors: Rahul Singh, Coppell, TX (US); Lance Johnson, Arvada, CO (US)

(73) Assignee: Entercoms, Inc., Irving, TX (US)

( * ) Notice: Subject to any disclaimer, the term of this patent is extended or adjusted under 35 U.S.C. 154(b) by 0 days.

(21) Appl. No.: 14/185,759

(22) Filed: Feb. 20, 2014

Related U.S. Application Data

(63) Continuation of application No. 14/144,548, filed on Dec. 31, 2013, now abandoned.

(60) Provisional application No. 61/882,426, filed on Sep. 25, 2013, provisional application No. 61/882,426, filed on Sep. 25, 2013.

(51) Int. Cl.
*G06Q 10/08* (2012.01)

(52) U.S. Cl.
CPC .................. *G06Q 10/0875* (2013.01)

(58) Field of Classification Search
None
See application file for complete search history.

(56) References Cited

U.S. PATENT DOCUMENTS

| | | | |
|---|---|---|---|
| 7,606,743 B2 * | 10/2009 | Orzell et al. | 705/28 |
| 7,966,214 B2 * | 6/2011 | Denton et al. | 705/7.25 |
| 8,229,791 B2 | 7/2012 | Bradley et al. | |
| 8,396,762 B2 | 3/2013 | Esau et al. | |

(Continued)

FOREIGN PATENT DOCUMENTS

| | | | |
|---|---|---|---|
| EP | 1364327 A2 | 11/2003 | |
| EP | 1785921 A1 | 5/2007 | |
| WO | 2000079453 A2 | 12/2000 | |

OTHER PUBLICATIONS

Myers, Tom, Kyle MacLean and Diane Westgate, Oracle Advanced Supply Chain Planning Implementation and User's Guide, Release 12.1, Nov. 2010, pp. 1-1566, including pp. 32-33, 37, 218, 607-624, 645-670, Oracle, Redwood City, PA.

(Continued)

*Primary Examiner* — Thomas L Mansfield
(74) *Attorney, Agent, or Firm* — Terrile, Cannatti & Chambers, LLP; Kent B. Chambers

(57) ABSTRACT

A part chain management system and method for generating chain sequences for parts in the aftermarket services industry is disclosed. Data on various parts and their substitutes is obtained from an engineering data management (EDM) team and translated into pair wise substitutional relationships represented in a known part substitutional relationship network. The system and method derive a part chain representation from known part substitutional relationships and inferences determined therefrom. The system and method can refine or filter the part chain representation based on rules such as business relationships. The system and method analyzes inferred part substitutional relationships for conflicts, which are either resolved automatically using conflict resolution rules or are referred for manual resolution. Following conflict resolution, the inferred links are finalized and used along with known links to generate a final part substitutional relationship network. Planning/inventory management tools can utilize the final network to plan and manage part substitutions.

28 Claims, 7 Drawing Sheets

(56) References Cited

U.S. PATENT DOCUMENTS

2003/0126023 A1\* 7/2003 Crampton et al. ............. 705/22
2006/0064344 A1\* 3/2006 Lidow ............................ 705/10
2006/0190342 A1\* 8/2006 Dendl et al. ................... 705/26
2007/0124009 A1\* 5/2007 Bradley et al. ................ 700/99

OTHER PUBLICATIONS

Modeling of Replacement Strategies, SAP Library—Product Interchangeability, Jul. 10, 2013, pp. 1-3, http://help.sap.com/saphelp_snc70/helpdata/en/f8/a71342814f5233e10000000a155106/frameset.htm.

SAP Service Parts Planning or SAP APO: Making the Best Choice for Your Business, SAP AG Frequently Asked Questions, 2011, pp. 1-7, vol. 50 093 433 (Nov. 2006). (Per MPEP 609.04(a), Applicant points out that the year of publication is sufficiently earlier than the effective U.S. filing date and any foreign priority date so that the particular month of publication is not in issue.).

Service Parts Planning (SPP), SAP Library—SAP Help Portal, Jul. 10, 2013, pp. 1-2, pahttp://help.sap.com/saphelp_snc70/helpdata/en/47/e12f019e014ac5e10000000a42189d/frameset.htm.

\* cited by examiner

| Part ID | Price | NPI | EOL | Lead Time |
|---------|-------|-----|-----|-----------|
| A | | | | |
| B | | | | |
| C | | | | |
| D | | | | |
| E | | | | |

Part Master 100

*FIG. 1*

| Part | Substitute | Direction |
|------|------------|-----------|
| A | B | One Way |
| B | C | Two Way |
| J | K | Two Way |
| K | M | One Way |

Known Relationship Matrix 200

*FIG. 2*

PART CHAIN MANAGEMENT IN AN AFTERMARKET SERVICES INDUSTRY

CROSS-REFERENCE TO RELATED APPLICATION

This application claims the benefit under 35 U.S.C. § 119(e) and 37 C.F.R. § 1.78 of U.S. Provisional Application No. 61/882,426, filed Sep. 25, 2013, and entitled "Part Chain Management in an Aftermarket Services Industry," which is incorporated by reference in its entirety.

This application is a continuation of U.S. patent application Ser. No. 14/144,548, filed Dec. 31, 2013, and entitled "Part Chain Management in an Aftermarket Services Industry", which is incorporated by reference in its entirety and also claims the benefit under 35 U.S.C. § 119(e) and 37 C.F.R. § 1.78 of U.S. Provisional Application No. 61/882,426, filed Sep. 25, 2013, and entitled "Part Chain Management in an Aftermarket Services Industry."

BACKGROUND OF THE INVENTION

Field of the Invention

The present invention relates in general to the field of electronics, and more specifically to part chain management in an aftermarket services industry.

Description of the Related Art

The aftermarket services industry includes multiple activities associated with a product or a service after a sale or lease of the product or service. Such activities include service and logistic activities such as product replacement management, fulfillment services, repair, recycling, refurbishment, disposal, warranty management and other warranty related services, product restocking, call center support, maintenance, and spare parts management among others. Such activities often continue throughout at least a portion of the life span of the product.

The life span of a product as a whole may or may not coincide with the life span of individual parts or subsystems (referred to herein as a "parts") of the product. The "life span" refers to the expected useful life for an intended purpose of a product or part. For example, in the aftermarket services industry, product and part life spans can have a wide range (e.g. 6 months-20 yrs) and often do not coincide. For example, a laptop computer system may have an average life span of 5 years, but the hard disk drive of the laptop computer system may have an average life span of 3 years.

SUMMARY OF THE INVENTION

In one embodiment of the present invention, a method includes performing in an electronic data processing system: receiving data from one or more data sources and identifying defined part substitutional relationships between multiple parts in the received data. The method further includes performing in the electronic data processing system: representing the defined substitutional part relationships in a 'known' part substitutional relationship representation, processing the defined part substitutional relationships to derive missing part substitutional links, and generating an 'inferred' part substitutional relationship representation using the missing part substitutional links. The method further includes performing in the electronic data processing system: generating a collective part substitutional relationship network of part chain sequences that includes substitutional relationships of parts from the known part substitutional relationship network and the inferred part substitutional relationship network and providing the collective part substitutional relationship network for access by a computer system.

In a further embodiment of the present invention, a system includes one or more processors and a non-transitory memory, coupled to the one or more processors, that includes code stored therein and executable by the one or more processors for: receiving data from one or more data sources and identifying defined part substitutional relationships between multiple parts in the received data. The code is further executable by the one or more processors for: representing the defined substitutional part relationships in a 'known' part substitutional relationship representation, processing the defined part substitutional relationships to derive missing part substitutional links, and generating an 'inferred' part substitutional relationship representation using the missing part substitutional links. The code is further executable by the one or more processors for: generating a collective part substitutional relationship network of part chain sequences that includes substitutional relationships of parts from the known part substitutional relationship network and the inferred part substitutional relationship network and providing the collective part substitutional relationship network for access by a computer system.

BRIEF DESCRIPTION OF THE DRAWINGS

Embodiments of the present invention may be better understood, and its numerous objects, features and advantages made apparent to those skilled in the art by referencing the accompanying drawings. The use of the same reference number throughout the several figures designates a like or similar element.

FIG. 1 depicts a representation of an exemplary Part Master.

FIG. 2 depicts a visual representation of an exemplary Relationship Matrix.

DETAILED DESCRIPTION

Figure 3:
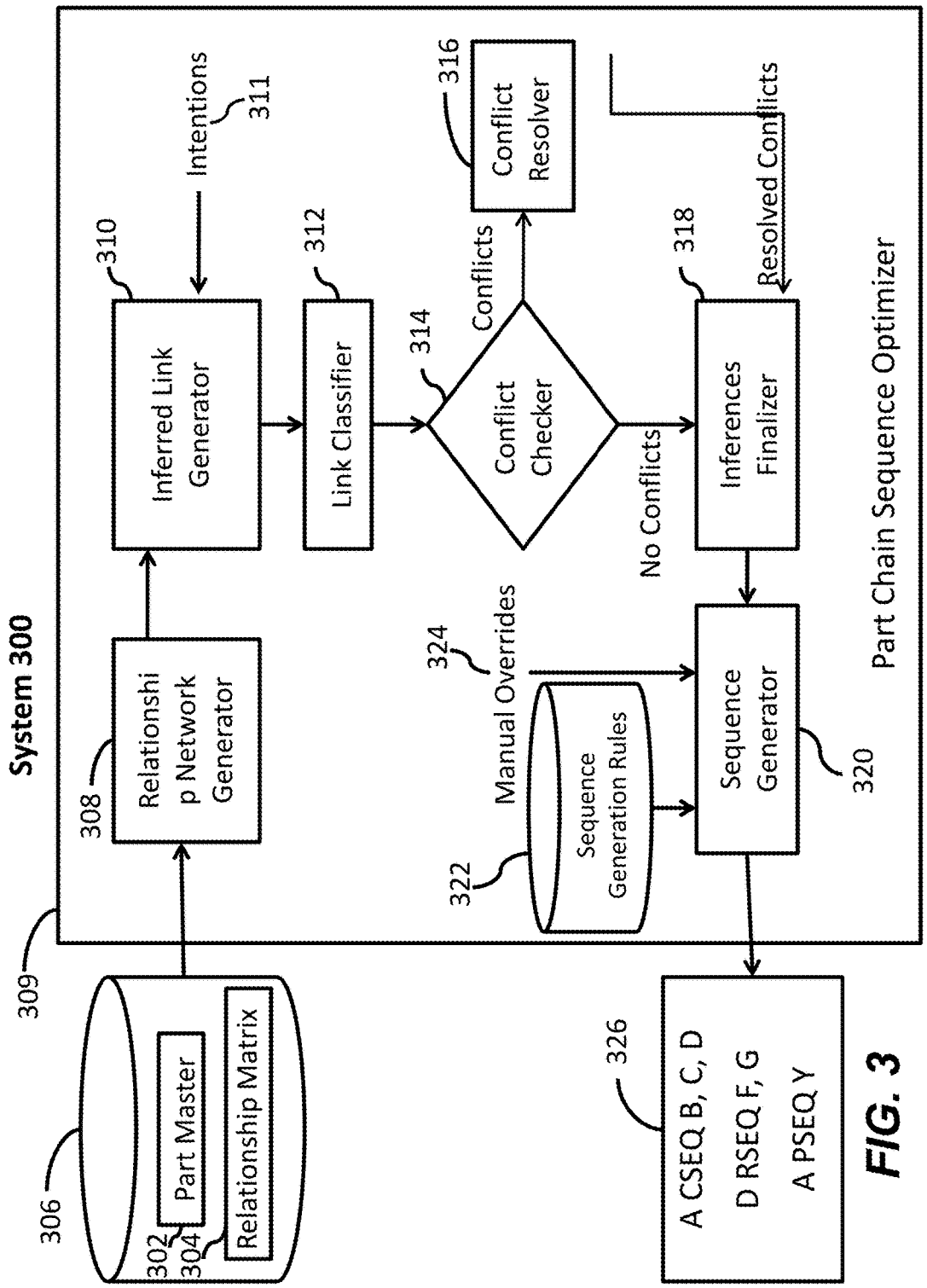
FIG. 3 depicts a system for generating chain sequences for parts in the aftermarket services industry.

In at least one embodiment, a system and method generate a collective part substitutional relationship network from defined part substitutional relationships provided by one or more data sources and from inferred part relationships. The defined part substitutional relationships define a links between a first part and an $N^{th}$ part but may have missing substitutional part links, and N is an integer greater than one and, in at least one embodiment, N is an integer greater than three. For example, a first part may be substitutable for a second part. But, the other parts may be substitutable for the first part and or the second part but are not identified in part substitutional links. To determine the missing part substitutional links, in at least one embodiment, an engine processes rules and links between parts to generate an 'inferred' part substitutional relationship representation. From the defined and inferred part substitutional relationships, the system and method can determine a collective part substitutional relationship network. In at least one embodiment, the system and method perform conflict checks among part substation rules to ensure that the collective part substitutional relationship network is accurate. In at least one embodiment, the inferred and/or collective part substitutional relationship network is optimized to meet one or more optimization criteria, such as providing the most available, most expensive, least expensive, most reliable, etc. substitution parts.

A part chain management system and method for generating chain sequences for parts in the aftermarket services industry is disclosed. Data on various parts and their substitutes is obtained from an engineering data management (EDM) team and translated into pair wise substitutional relationships represented in a known part substitutional relationship network. The system and method derive a part chain representation based inferences from known part substitutional relationships and inferences determined therefrom using, for example, an inference engine. Additionally, the system and method can refine or filter the part chain representation based on rules such as business relationships. In at least one embodiment, system and method analyzes inferred part substitutional relationships for conflicts, which are either resolved automatically using conflict resolution rules or are referred for manual resolution. Following conflict resolution, the inferred links are finalized and used along with known links to generate a final part substitutional relationship network. Planning/inventory management tools can then use the final network to plan and manage part substitutions.

In at least one embodiment, the part chain management system and method provides part chain management in an aftermarket services industry. In at least one embodiment, part chain management includes identifying parts and substitutable parts therefor and generating prioritized usage sequences of substitutable parts. In at least one embodiment, the part chain management system generates sequences for particular operation modes, such as consumption, replenishment, and procurement. In at least one embodiment, the part chain management system utilizes the sequences to specify substitute parts when a particular part is not used. In at least one embodiment, the part chain management system directly or indirectly provides the sequences to a fulfillment or order management system to allow the system to utilize substitute parts as desired.

In at least one embodiment, the part chain management system and method tracks the life span or receives life span tracking data for some or all products and parts in a particular region (for example, geographical, political, or business defined regions to understand the life span relationships between a product and the parts constituting the product. Tracking such relationships for fulfillment, procurement, repair, and/or inventory replenishment can provide a more optimal use of inventory levels relative to conventional ordering systems. In at least one embodiment, tracking such relationships using the part chain management system can decrease inventory costs and positively affect customer satisfaction level through, for example, faster turnaround times.

In some industries (e.g. computer technology industries) several parts are substitutable. For example, a 320 GB hard drive may be substitutable for a 240 GB hard drive. Traditional planning systems, warehousing systems, and engineering departments often struggle to identify all part substitution opportunities. Parts substitutions can improve material usage efficiency, minimize stocking of excess/scrap parts, and reduce material and carrying costs. Inefficient management of part chains leads to accumulating excess and when this excess is sold back into the market it usually would have eroded in price. If excess inventory is held for long, its value will diminish leading to significant scrapping. Part chain management refers to identifying parts and substitutable parts therefor and generating prioritized usage sequences of substitutable parts.

Part relationships can be broadly classified into two types of substitutions—two-way and one-way relationships. Two-way relationships identify interchangeable parts, and one-way relationships specify the possible replacements for an original part. For example, if part A and part B follow a two-way relationship, part A can be used as a substitute for part B and vice versa. If part A and part B have a one-way relationship in the forward direction, then part B can replace part A, but part A is not a replacement for part B.

Traditional tools for identifying part substitutes do not provide a comprehensive, logical, technical platform to part ordering planners for receiving parts-related data, identifying part substitutes, and for analyzing multiple potential part substitutes to generate priority sequences that can be directly used by order management systems. The disclosed part chain management system and method, in at least one embodiment, generates part chain sequences for parts in an aftermarket services industry and provides a solution to optimize inventory management by identifying the commonality and the substitutional links between parts so that maximum profit levels are attained. As used herein, "links between parts" refers to the one-way or two-way substitutional relationship between parts. An overview of an exemplary part chain management method includes the following steps:

1) Identifying all the known part substitutional relationships that are accessible to the part chain management system by receiving and processing data on defined relationships generated by and available from multiple data sources and representing these substitutional part relationships in a known part substitutional relationship network. Exemplary data sources are data engineering, planning, and fulfillment data systems;

2) Reviewing the known part substitutional relationships, mathematically deriving missing substitutional links in the known part substitutional relationship network and then deriving an inferred part substitutional relationship network so that a collective part substitutional relationship network includes preferably all substitutional relationships of parts from the known part substitutional relationship network and the inferred part substitutional relationship network.

3) Identifying conflicting relationships between parts in the inferred part substitutional relationship network such as circular substitutional relationships and inconsistent substitutional relationships and resolving all such conflicting relationships either automatically or manually.

4) Finalizing the inferred part substitutional relationships after conflict resolution and using the finalized part substitutional relationship network to create different priority sequences referred to as part chain sequences such as Consume Sequence, Procure Sequence, and Replenish Sequence.

5) Generating a collective part substitutional relationship network that includes substitutional relationships of parts from the known part substitutional relationship network and the inferred part substitutional relationship network.

A data source or sources, such as engineering data management (EDM) systems, provide known parts and link information regarding most, if not all, parts in the aftermarket supply chain and the defined substitutional links between the parts. This information is stored in a database using, for example, a part master and a relationship matrix. The part master and the relationship matrix may be provided directly by the data source(s) or a data processing engine may be used to process raw data to obtain meaningful information and translate the processed data into a part master and relationship matrix.

FIG. 1 depicts an exemplary Part Master 100, which is a table that defines various characteristics of the parts that are involved in the supply chain. The Part Master 100 contains information on all the individual parts. This information includes, but is not limited to, price of the part, New Product Introduction (NPI) date, End of Life (EOL) date, lead time for the delivery of a part, etc. The EDM teams may directly provide the Part Master 100 or else, for example, a part chain management system, such as part chain management system 300 (FIG. 3), receives part data from one or more data sources and executes a data processing engine to consolidate the data to generate the Part Master 100

FIG. 2 depicts an exemplary Relationship Matrix 200, which represents the given substitutional links between various parts. The known substitutional links are: part B is a one-way substitute for part A, and parts B and C are interchangeable. If there is a demand for part A, from the Relationship Matrix 200, the part chain management system 300 can determine the more complex, inferred parts relationships for A, which are (i) part B can substitute for part A, (ii) part B is interchangeable with part C, so (iii) part C can substitute for part A. The Relationship Matrix 200 also supports exceptions. In the above case, an exception could be created to prevent the substitution of part A with part C if, for example, part C is not allowed to be supplied in a particular geographical region.

In at least one embodiment, data sources, such as an EDM team or an engine in the part chain management system 300 generates the Relationship Matrix 200 through recursive processing. In at least one embodiment, the first step in generating the Relationship Matrix 200 is to obtain all the known part links and then find and figuratively highlight any conflicts in the data. A recursive process generates the Relationship Matrix 200 in stages and utilizes feedback to correct part links so that the end resultant Relationship Matrix 200 accurately reflects the part links. The process involves a design step which ensures that the parts are actually substitutable. A feedback step identifies problems in establishing substitutions which leads to the creation of exceptions.

In at least one embodiment, the part chain management system 300 (i) takes, as an input, the Part Master 100 and the Relationship Matrix 200, (ii) generates a model of pair wise substitutional relationships between parts represented in a known part substitutional relationship network, (iii) applies mathematical algorithms to derive inferred part substitutional links represented in an inferred part substitutional relationship network, (iv) checks for and resolves conflicts in the inferred part substitutional relationship network and, (v) generates prioritized usage sequences of substitutable parts, referred to as part chain sequences. Part chain sequences include, but are not limited to, the sequences listed below.

1. Consume Sequence: A consume sequence (CSEQ) represents the possible substitutes for a part during consumption. For example, A CSEQ B, C, D implies that if there is a demand for part A and part A is not available then parts B, C or D can be consumed instead. "Consumption" refers to identifying a part for inclusion in a product.
2. Replenish Sequence: A replenish sequence (RSEQ) represents the possible substitutes for a part during replenishment. For example, D RSEQ F, G implies that if there is a replenishment request for part D, parts F and G may be provided as substitutes. "Replenishment" refers to restocking of a part in a part storage facility, such as a warehouse, when the number of stored parts falls below a minimum value.
3. Procure Sequence: A procure sequence (PSEQ) represents the possible substitutes for a part during procurement. For example, A PSEQ Y implies that if part A has to be procured but is unavailable at the time, part Y can be procured instead to meet the demand. "Procure" refers to purchase of a part.

Figure 4:
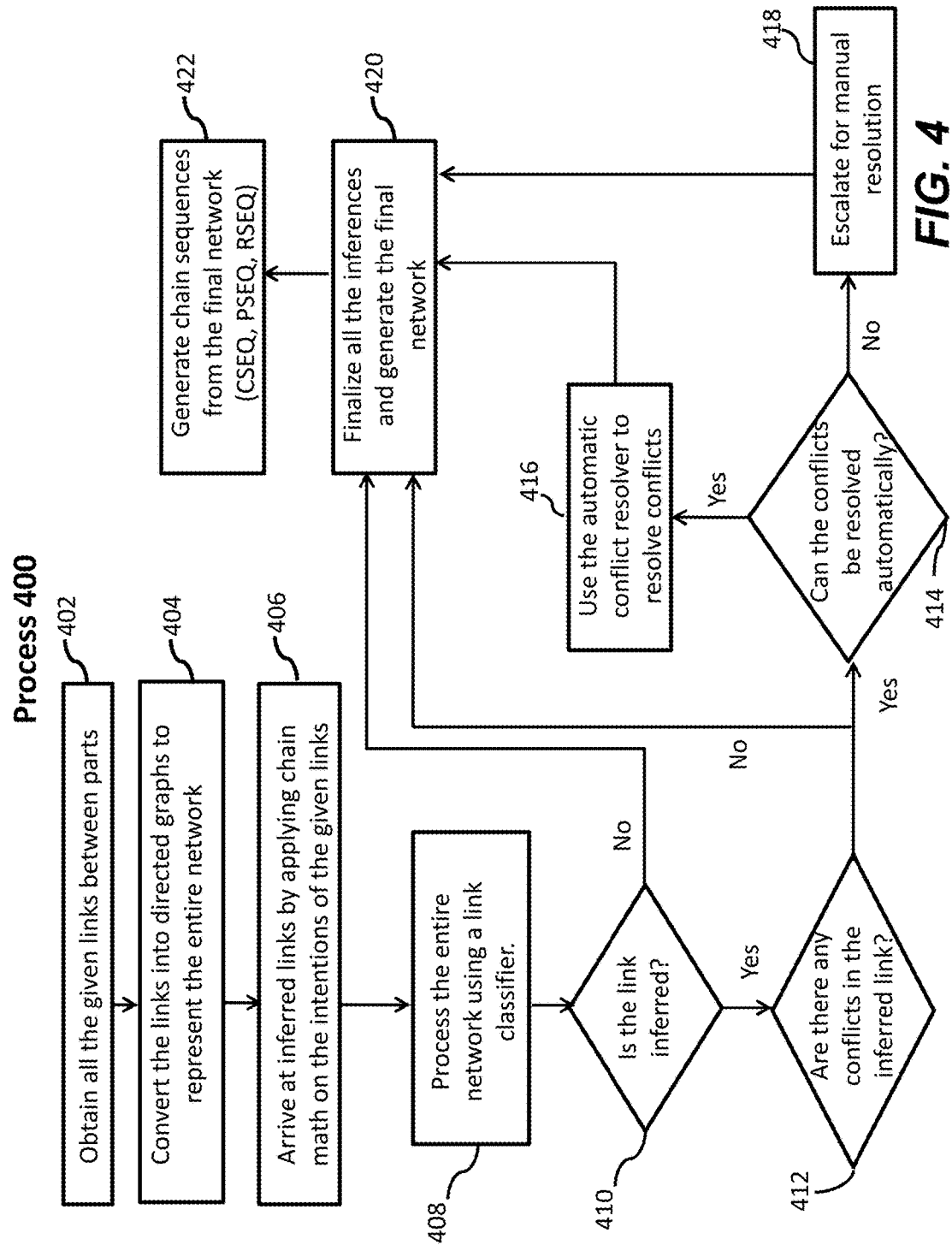
FIG. 4 depicts a process of generating chain sequences for parts in the aftermarket services industry.
Figure 5:
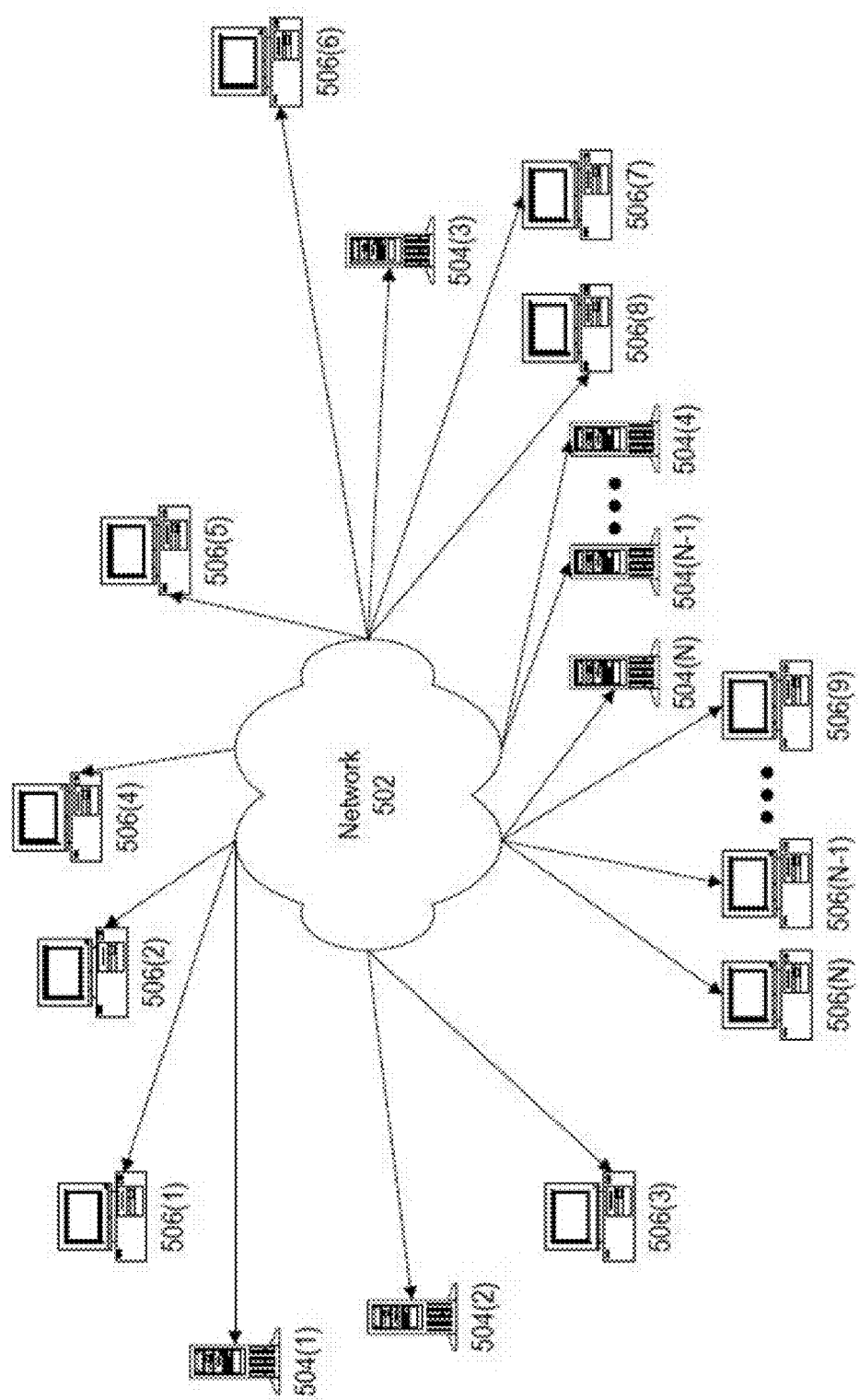
FIG. 5 depicts a network environment in which the system and process of FIGS. 3 and 4 may be practiced.

FIG. 3 depicts a part chain management system 300, which illustrates an exemplary embodiment of a part chain management system for generating part chain sequences for parts in the aftermarket services industry. FIG. 4 depicts an exemplary process 400 for generating chain sequences for parts. In at least one embodiment of the disclosed invention, the Relationship Network Generator performs step 402. The Part Master 302 and the Relationship Matrix 304 are stored in a Parts Database 306. In operation 402, the Part Chain Sequence Optimizer 309 retrieves the Part Master 302 and Relationship Matrix 304 from the Parts Database 306. In operation 404, the Relationship Network Generator 308 translates the data into pair wise substitutional relationships between parts referred to as a known part substitutional relationship network. In at least one embodiment, the Relationship Network Generator 308 processes the substitutional links in the Part Master 302 and the Relationship Matrix 304 to create a directed graph structure referred to as the known part substitutional relationship network, where each node in the network represents a part and the edges represent the substitutional link relationships between the parts. In operation 406, an Inferred Link Generator 310 processes the known part substitutional relationship network and takes into account business requirements while deriving a part chain representation that represents the known part substitutional relationship network and derived inferred substitutional links. Business requirements are, for example, rules that specify particular fulfillment parameters for particular parts in order of, for example, preference, contractual obligations, etc. A business intention 311 (for example, CAN substitute, MUST substitute and NEVER substitute) is assigned to each of the known substitutional links by the Inferred Link Generator 310 and these intentions are used as parameters in the part chain representation to derive all possible inferred substitutional links. Link weights may be added to each substitutional link using a mathematical weighting function to prioritize links based on factors such as most or least expensive cost, criticality, reliability, most risk, lead time, availability, etc. The link weights are used to optimize the inferred or a collective part substitutional relationship network based on one more optimization criteria. The optimization criteria includes at least: lowest cost parts, most expensive parts, most reliable parts, most critical parts, and most available parts. The Inferred Link Generator 310 utilizes an inference engine to process the known part substitutional relationship network to derive the inferred part substitutional relationship network to generate a complete part chain, which includes known and inferred links between the parts. The complete part chain may contain all known and inferred links, or can include a proper subset of the links. A complete set of links may be filtered to generate the proper subset of the links based on factors that restrict part usage, such as example, business relationships that restrict certain part sources, exceeding maximum costs, excessive shipping times, etc. After the inferred part substitutional relationship network, including known and inferred links, is generated, the substitutional links in the network are processed by a Link Classifier 312 in operation 408 which classifies the links as, either known links or inferred links. Known links represent links between parts that are defined by, for example, EDM teams while inferred links represent links that are derived from known links using an inference engine. In operation 410, inferred links are selected from the inferred part substitutional relationship network by the Link Classifier 312. In operation 412, the inferred links are checked for conflicts by a Conflict Checker 314. If any conflicts are found then a Conflict Resolver 316 is executed to resolve conflicts automatically as indicated in operation 416 based on a set of pre-defined conflict resolution rules. If the conflicts remain unresolved, the unresolved conflicts are escalated to, for example, EDM teams for manual resolution in operation 418. After the existing conflicts are resolved, the inferred links are finalized in operation 420 using an Inference Finalizer 318 and passed onto the Sequence Generator 320. In operation 422, the Sequence Generator 320 uses a Sequence Generation Rules Database 322, which defines various sequence generation rules based on business requirements, to generate the consume, replenish and procure sequences for the entire network. The Sequence Generator 320 also has an option for Manual Override 324 which enables a planner to override the sequence generation rules in the Sequence Generation Rules Database 322 during sequence generation. The final output of the Part Chain Sequence Optimizer 309 is a set of Part Chain Sequences 326 which can be directly fed into an inventory planning or order management system.

As previously mentioned, FIG. 4 depicts an exemplary process 400 for generating chain sequences for parts and further discussed below. In at least one embodiment of the disclosed invention, the first step 402 is carried out by the Relationship Network Generator 308. The Part Master 302 and Relationship Matrix 304 are retrieved from the Parts Database 306 and used to obtain all the known links that are defined by the EDM team. The known links are translated into a known part substitutional relationship network in step 404, where each node represents a part and the links between the nodes represent substitutional relationships between the parts. The part chain representation is derived at step 406. The Inferred Link Generator 310 utilizes an inference engine, which for example, applies standard graph algorithms known in the art to the known part substitutional relationship network, to derive the inferred part substitutional relationship network which includes all the possible links between the parts. To prioritize certain links over others, weights are assigned to each link using a mathematical weighting function based on various parameters such as lead time, availability, reliability, cost, risk, etc. After assigning weights, all known links and all inferred links are identified at step 408 using a Link Classifier 312. Known links represent links between parts that are defined by EDM teams. Inferred links represent links that are derived from known links. It is determined at step 410 whether or not the link is an inferred link. If the link is an inferred link, the process branches to step 412. If the links are not inferred links, the process instead branches to step 420 where the substitutional links are ready to be finalized. Inferred links may contain conflicts such as circular relationships or inconsistent relationships which need to be resolved. Inferred links are checked for conflicts using a Conflict Checker 314 at step 412. If there are no conflicts, the process branches to step 420 where the inferences are ready to be finalized along with the known links. If there are conflicting relationships in the inferred link, the process instead branches to step 414 where a Conflict Resolver 316 is invoked to check whether the conflicts can be resolved automatically. If automatic resolution is possible, the process branches to step 416 where the automatic Conflict Resolver 316 is used to resolve conflicts automatically using a set of pre-defined conflict resolution rules. If automatic resolution based on the pre-defined conflict resolution rules is not possible, the process instead branches to step 418 where the unresolved conflicts are escalated to the EDM team for manual resolution. After all the conflicts are resolved, either automatically at 416 or manually at 418, the resulting resolved inferences reach step 420 where the Inference Finalizer 318 finalizes them along with the inferences that had no conflicts. The finalized inferences are used along with the known links to generate a finalized part substitutional relationship network at step 420. The Sequence Generator 320 uses Sequence Generation Rules Database 322 to generate the chain sequences CSEQ, PSEQ and RSEQ in 326.

Figure 7:
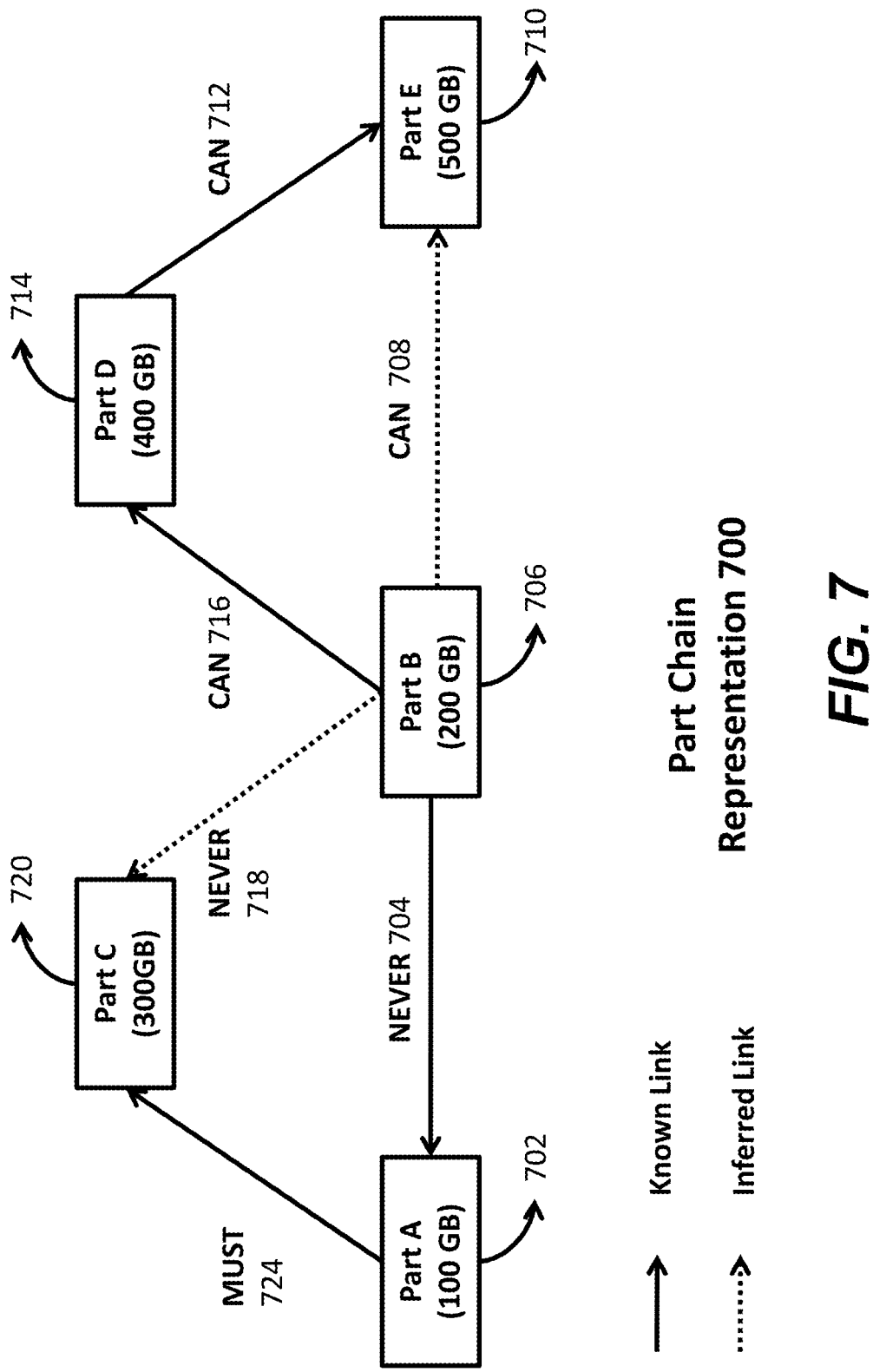
FIG. 7 depicts an exemplary collective part substitutional relationship network representing known and inferred part substitutional relationships.

FIG. 7 depicts an exemplary collective part substitutional relationship network representing known and inferred part substitutional relationships. Based on business rules, business intentions 311 such as CAN substitute, NEVER substitute and MUST substitute are assigned to the links (defined in the Relationship Matrix 200) between parts (defined in the Part Master 100). For example, the Part Master 100 defines parts A (702), B (706), C (720), D (714) and E (710) as 100, 200, 300, 400 and 500 GB hard disks respectively. Using the Relationship Matrix 200 the following intentions are defined. Part B 706 (200 GB hard disk) should NEVER 704 be substituted by part A 702 (100 GB hard disk), but part B 706 (200 GB hard disk) CAN 716 be substituted by part D 714 (400 GB hard disk), which in turn CAN 712 be substituted by part E 710 (500 GB hard disk). Additionally, part A 702 (100 GB hard disk) MUST 724 be substituted by part C 720 (300 GB hard disk).

When these intentions are represented in the known part substitutional relationship network, each part is represented as a node and the substitutional relationships between them are represented as substitutional links. In this embodiment, the Inferred Link Generator 310 derives all possible part substitutional links. Since the intention from part B 706 to part D 714 as well as the intention from part D 714 to part E 710 are represented by CAN links (712 and 716), the Inferred Link Generator 310 derives the link from part B 706 to part E 710 as a CAN 708 link (CAN+CAN=>CAN). Such derived substitutional links are referred to as inferred links. This means that if there is a demand for a 200 GB hard disk, it CAN be substituted by a 400 GB hard disk or a 500 GB hard disk. Similarly, since the intention from part B 706 to part A 702 is represented by a NEVER 704 link and the intention from part A 702 to part C 720 is represented by a MUST 724 link, the Inferred Link Generator 310 applies the defined logic to infer that the link from part B 706 to part C 720 is a NEVER link 704 (NEVER+MUST=>NEVER). This means that the 200 GB hard disk is NEVER substituted using a 300 GB hard disk. All possible links between parts i.e. the known links and inferred links are represented in the inferred part substitutional relationship network.

To prioritize links, weights are added after the inferred part substitutional relationship network is generated. Weights are added using a mathematical weighting function that translates parameters such as cost, quantity, lead time, risk, etc. into respective link weights. In the example above, the Inferred Link Generator 310 derived that a 200 GB hard disk can be substituted either by a 400 GB hard disk or by a 500 GB hard disk. Using a weighting function based on cost, links weights can be assigned to both these links during optimization. If the business requirement is to pick the cheapest option and if the substitution by 400 GB is cheaper, the assigned weights enable the system to identify that the 400 GB substitutional link has to be prioritized over the 500 GB substitutional link. Weights can also be assigned based on other parameters such as lead time for procuring a product. After weights are assigned to all the links, standard graph algorithms such as shortest-path or minimum-costs are used for prioritization of the substitutional links. Then each substitutional link is classified as either known or inferred using the Link Classifier 312. The inferred links are then checked for conflicting relationships and if there are none, the inferred links are finalized using an Inference Finalizer 318. If there are conflicting relationships that need to be resolved, a Conflict Resolver 316 is invoked to automatically resolve conflicts using a set of pre-defined conflict resolution rules. Conflicts that cannot be automatically resolved are escalated to the EDM teams for manual resolution.

In at least one embodiment, the entire process is run once a week in a batch. This is done to implement a feature called delta analysis which identifies any changes to the chain logic and prevents the accumulation of locked inventory—parts which cannot be consumed as there are no consumption paths for those parts. For example, an old Relationship Matrix R1 defined that part C can be consumed for part A. Based on this relationship part C was stocked in warehouses. A revision in the Relationship Matrix R1 or a system error could cause the substitutional link from part C to part A to be no longer valid. If this change is not identified, the inventory for part C will never get used because when there is a request for part A, part C will never be supplied. The delta analysis feature allows the user to compare the current substitutional relationships with previous substitutional relationships and identify any such changes at an early stage. In delta analysis, the system collects all the substitutional relationships from multiple sources, reviews all the chains and mathematically derives missing substitutional links and substitutional relationships using the Inferred Link Generator 310.

The Conflict Resolver 316 is an advantageous feature of system 300. It resolves conflicts by identifying all conflicting relationships between the inferred links, namely circular relationships and inconsistent relationships. For example, if the business intentions define that part A CAN be substituted by part B and that part B CAN be substituted by part C, the Inferred Link Generator 310 would derive that part A CAN be substituted by part C (CAN+CAN=>CAN). However, the EDM team may have defined an intention: NEVER substitute part A with part C. This conflicting relationship between parts A and C is an example of an inconsistent relationship. As another example, the business intentions define that part D MUST be substituted by part E, that part E MUST be substituted by part F and that part F MUST be substituted by part D. The Conflict Resolver 316 would identify that a loop D-E-F-D is created in the system which prevents the right part from being selected. Such conflicting loops are referred to as circular relationships. In at least one embodiment of the present invention, after the conflicts are identified, the conflict resolution engine applies pre-defined conflict resolution rules to resolve such conflicts. The pre-defined conflict resolution rules include, but are not limited to, prioritization based on known links and prioritization based on inferred links. If, for example, the pre-defined conflict resolution rules require prioritization based on known links, then in the above example, the resulting resolved inference is NEVER substitute part A with part C. If the conflict cannot be resolved according to the pre-defined conflict resolution rules, a flag is raised and the conflict is escalated to the EDM team for resolution.

The Sequence Generation Rules Database 322 connected to the Sequence Generator 320 is another advantageous feature of the system 300. Several sequence generation rules can be created and then applied during sequence generation based on different business requirements. The criteria used to create such sequence generation rules include, but are not limited to:

1. Age of the part in the supply chain
2. Procurability of the part
3. Commonality of the part
4. Cost of the part
5. NPI (New Product Introduction) date of the part In at least one embodiment, selection is based on the NPI date of the part. For example, part A is linked to parts B, C and D in the manner A CSEQ B, C, D. Parts A, B, C and D have NPI dates of 2005, 2007, 2001 and 2008 respectively. If all of these parts are at present available in sufficient quantity, then a sequence generation rule can be created to consume the part with oldest NPI date first. So if there is a demand for part A, then part C which has the oldest NPI date will substitute part A.

In at least another embodiment, commonality is an important criterion while optimizing the substitutional links in the network. For example, while generating consume or replenish sequences, the sequence generation rules are applied to guide the system 300 to least commons. Least commons are the parts which can only substitute a relatively small number of other parts. On the other hand, while generating the procure sequence, the sequence generation rules are applied to guide the system 300 to most commons. Most commons are the parts which can substitute a relatively large number of other parts.

Another advantageous feature of the embodiments of the disclosed invention is that the planner can generate relationship sequences product wise and region wise. It is often noticed that the part chain for a product such as a laptop is different from that for a desktop computer. These differences vary according to regions as well. The US might have a different part chain for a mobile phone as compared to the UK. The system 300 provides the planner with an option to consider all these differences and generate part chain sequences that are specific to a product and to a region. In at least one embodiment, the final part chain sequences are a collective part substitutional relationship network that includes substitutional relationships of parts from the known part substitutional relationship network and the inferred part substitutional relationship network.

In at least one embodiment, after the collective part substitutional relationship network of part chain sequences is generated, the collective part substitutional relationship network is available as a separate computer file ready to be consumed by inventory planning and order management tools. Some embodiments also provide a way to integrate the output of the part chain sequence optimizer directly into the inventory planning and order management tools.

FIG. 500 is a block diagram illustrating a network environment in which a part chain management system 300 may be practiced. Network 502 (e.g. a private wide area network (WAN) or the Internet) includes a number of networked server computer systems 504(1)-(N) that are accessible by client computer systems 506(1)-(N), where N is the number of server computer systems connected to the network. Communication between client computer systems 506(1)-(N) and server computer systems 504(1)-(N) typically occurs over a network, such as a public switched telephone network over asynchronous digital subscriber line (ADSL) telephone lines or high-bandwidth trunks, for example communications channels providing T1 or OC3 service. Client computer systems 506(1)-(N) typically access server computer systems 504(1)-(N) through a service provider, such as an internet service provider ("ISP") by executing application specific software, commonly referred to as a browser, on one of client computer systems 506(1)-(N).

Client computer systems 506(1)-(N) and/or server computer systems 504(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as non-transitory, computer readable hard disks, compact disk ("CD") drives, digital versatile disk ("DVD") drives, and magneto-optical drives may also be provided, either as an integrated or peripheral device. One such example computer system is shown in detail in FIG. 6.

Figure 6:
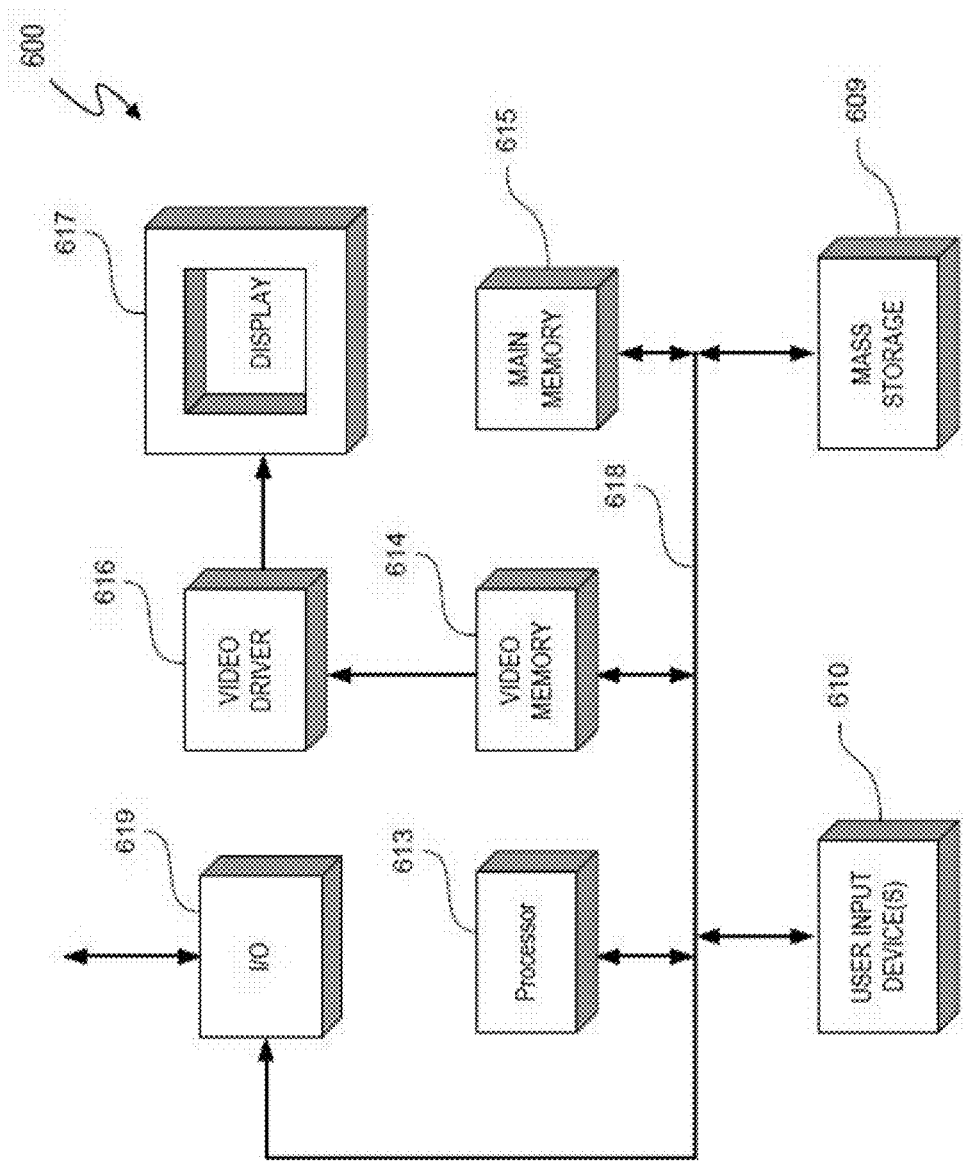
FIG. 6 depicts an exemplary computer system.

Embodiments of the part chain management system 300 can be implemented on a computer system such as a general-purpose computer 600 illustrated in FIG. 6. Input user device(s) 610, such as a keyboard and/or mouse, are coupled to a bi-directional system bus 618. The input user device(s) 610 are for introducing user input to the computer system and communicating that user input to processor 613. The computer system of FIG. 6 generally also includes video memory 614, main memory 615 and mass storage 609, which are all tangible, non-transitory, and coupled to bi-directional system bus 618 along with input user device(s) 610 and processor 613. The mass storage 609 may include both fixed and removable media, such as other available mass storage technology. Bus 618 may contain, for example, 32 address lines for addressing video memory 614 or main memory 615. The system bus 618 also includes, for example, an n-bit data bus for transferring DATA between and among the components, such as CPU 609, main memory 615, video memory 614 and mass storage 609, where "n" is, for example, 32 or 64. Alternatively, multiplex data/address lines may be used instead of separate data and address lines.

I/O device(s) 619 may provide connections to peripheral devices, such as a printer, and may also provide a direct connection to a remote server computer system via a telephone link or to the Internet via an ISP. I/O device(s) 619 may also include a network interface device to provide a direct connection to a remote server computer system via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 609 until loaded into main memory 615 for execution. Computer programs may also be in the form of electronic signals modulated in accordance with the computer program and data communication technology when transferred via a network. The method and functions relating to part chain management system 300 may be implemented in a computer program stored in a non-transitory, computer readable medium and executed by a computer, implemented in hardware alone using, for example, logic circuits, or implemented using a combination of hardware and software to create a unique, operational machine and process.

The processor 613, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the display 617. Video amplifier 616 is well known in the art and may be implemented by any suitable means. This circuitry converts pixel DATA stored in video memory 614 to a raster signal suitable for use by display 617. Display 617 is a type of monitor suitable for displaying graphic images.

The computer system described above is for purposes of example only. The part chain management system 300 may be implemented in any type of computer system or programming or processing environment. It is contemplated that the part chain management system 300 might be run on a stand-alone computer system, such as the one described above. The part chain management system 300 might also be run from a server computer systems system that can be accessed by a plurality of client computer systems interconnected over an intranet network. Finally, the part chain management system 300 may be run from a server computer system that is accessible to clients over the Internet.

Although the embodiments have been described in detail, it should be understood that various changes, substitutions, and alterations can be made hereto without departing from the spirit and scope of the invention.

What is claimed is:
1. A method comprising:
  executing code, stored in a non-transitory computer readable storage medium, by a processor in an electronic data processing system to configure the electronic data processing system into a machine that provides a logical, technical platform for generating a defined and inferred, aftermarket supply chain, collective, part substitutional relationship network from parts data and defined part substitutional relationship data by:
    receiving the parts data and the defined part substitutional relationship data from one or more data sources;
    translating the parts data and defined part substitutional relationship data into pair wise substitutional relationships in a defined part substitutional relationship network for an aftermarket supply chain;

processing the defined part substitutional network to derive missing, part substitutional links, wherein the missing, part substitutional links are absent from the defined substitutional part relationships, wherein processing the defined part substitutional network to derive missing, part substitutional links comprises executing a recursive process on the defined part substitutional relationship network that includes a feedback operation to correct erroneous part substitutional links to generate the resultant, part substitutional relationship network to accurately include part substitutional links;

generating an inferred, part substitutional relationship representation using the derived missing, part substitutional links;

generating an aftermarket supply chain, collective, part substitutional relationship network of part chain sequences that includes substitutional relationships of parts from the defined part substitutional relationship representation and the inferred, part substitutional relationship representation; and processing the collective, part substitutional relationship network to identify substitute parts; and performing at least one of: (1) fulfilling orders with the identified substitute parts, (2) procuring the identified substitute parts, (3) repairing with the substitute parts, and (4) replenishing inventory with the substitute parts by utilizing the substitute parts identified from the provided aftermarket supply chain, collective, part substitutional relationship network.

2. The method of claim 1 wherein receiving the parts data and the defined part substitutional relationship data, from one or more data sources, representing defined part substitutional relationships between multiple parts further comprises:

receiving first data representing one-way part substitutional relationships, wherein, in a one-way part substitutional relationship, a first part is substitutable for a second part but the second part is not substitutional for the first part; and receiving second data representing two-way part substitutional relationships, wherein, in a two-way part substitutional relationship, a third part is substitutable for a fourth part and the fourth part is substitutional for the third part.

3. The method of claim 1 wherein:

generating an aftermarket supply chain, collective, part substitutional relationship network of part chain sequences further comprises:

representing the defined substitutional part relationships in a known, part substitutional relationship representation that represents a first part, an $N^{th}$ part, and intervening, substitutional parts that identifies a substitutional link that the $N^{th}$ part is a substitute for the first part because each intervening, substitutional part is a substitute for a preceding part in the defined part substitutional relationship representation, wherein N is an integer equal to at least 3.

4. The method of claim 1 wherein generating an inferred, part substitutional relationship representation using the derived missing, part substitutional links further comprises:

applying defined logic operations to infer intervening, substitutional parts that link parts in the defined part substitutional relationship representation.

5. The method of claim 1 wherein generating at least one of the inferred, part substitutional relationship and the collective, part substitutional relationship network further comprises:

optimizing at least one of the inferred, part substitutional relationship and the collective, part substitutional relationship network based on one more optimization criteria.

6. The method of claim 5 wherein optimizing at least one of the inferred, part substitutional relationship and the collective, part substitutional relationship network further comprises:

processing weights of the parts to determine a contribution of the weights of each part to each optimization criterion; and determining at least one of the inferred, part substitutional relationship and the collective, part substitutional relationship network based on the contribution of the weights of each part which results in at least one of the inferred, part substitutional relationship and the collective, part substitutional relationship network meeting the optimization criteria.

7. The method of claim 5 wherein the optimization criteria comprises a group that includes at least one member of a group consisting of: lowest cost parts relative to all other parts in the inferred, part substitutional relationship, most expensive parts relative to all other parts in at least one of (i) the inferred, part substitutional relationship and (ii) the collective, part substitutional relationship network, most reliable parts relative to all other parts in at least one of (i) the inferred, part substitutional relationship and (ii) the collective, part substitutional relationship network, most critical parts relative to all other parts in at least one of (i) the inferred, part substitutional relationship and (ii) the collective, part substitutional relationship network, and most available parts relative to all other parts in at least one of (i) the inferred, part substitutional relationship and (ii) the collective, part substitutional relationship network.

8. The method of claim 1 further comprising:

performing in the electronic data processing system:

identifying conflicting relationships between parts in the defined part substitutional relationship representation;

resolving the conflicting relationships; and finalizing the defined part substitutional relationships after resolving the conflicting relationships; and generating the aftermarket supply chain, collective, part substitutional relationship network comprises generating the collective, part substitutional relationship network from the finalized defined part substitutional relationship representation and the inferred, part substitutional relationship representation.

9. The method of claim 1 further comprising:

performing in the electronic data processing system:

processing conflict resolution rules to identify conflicting relationships between parts in the inferred, part substitutional relationship representation;

resolving the conflicting relationships;

finalizing the inferred, part substitutional relationship representation after resolving the conflicting relationships; and using the finalized part substitutional relationship representation to create multiple, unique priority sequences.

10. The method of claim 9 wherein identifying conflicting relationships between parts in the inferred, part substitutional relationship representation further comprises:

identifying circular substitutional relationships and inconsistent substitutional relationships.

11. The method of claim 9 wherein the multiple, unique priority sequences comprise a consume sequence, procure sequence, and replenish sequence.

12. The method of claim 9 further comprising:
performing in the electronic data processing system:
providing the sequences to an order management system for the order management system to utilize substitute parts identified in the priority sequences.

13. The method of claim 1 wherein receiving the parts data and the defined part substitutional relationship data from one or more data sources further comprises:
receiving data from at least two members of a group consisting of: a call center database, a warehouse shipping database, and an engineering part release database.

14. The method of claim 1 further comprising:
performing in the electronic data processing system:
visually displaying the inferred, part substitutional relationship representation.

15. A system comprising:
one or more processors; and
a non-transitory memory, coupled to the one or more processors, that includes code stored therein and executable by the one or more processors to configure a computer system into a machine that provides a logical, technical platform for generating a defined and inferred, aftermarket supply chain, collective, part substitutional relationship network from parts data and defined part substitutional relationship data for direct use by computer system by:
receiving the parts data and the defined part substitutional relationship data from one or more data sources;
translating the parts data and defined part substitutional relationship data into pair wise substitutional relationships in a defined part substitutional relationship network for an aftermarket supply chain;
processing the defined part substitutional network to derive missing, part substitutional links, wherein the missing, part substitutional links are absent from the defined substitutional part relationships, wherein processing the defined part substitutional network to derive missing, part substitutional links comprises executing a recursive process on the defined part substitutional relationship network that includes a feedback operation to correct erroneous part substitutional links to generate the resultant, part substitutional relationship network to accurately include part substitutional links;
generating an inferred, part substitutional relationship representation using the derived missing, part substitutional links;
generating an aftermarket supply chain, collective, part substitutional relationship network of part chain sequences that includes substitutional relationships of parts from the defined part substitutional relationship representation and the inferred, part substitutional relationship representation; and
providing the aftermarket supply chain, collective, part substitutional relationship network for access by the computer system to allow the computer system to directly utilize the collective, part substitutional relationship network to identify substitute parts to perform at least one of (1) fulfilling orders with the identified substitute parts, (2) procuring the identified substitute parts, (3) repairing with the substitute parts, and (4) replenishing inventory with the substitute parts.

16. The system of claim 15 wherein the code executable by the one or more processors for receiving the parts data and the defined part substitutional relationship data, from one or more data sources, representing defined part substitutional relationships between multiple parts is further executable by the one or more processors for:
receiving first data representing one-way part substitutional relationships, wherein, in a one-way part substitutional relationship, a first part is substitutable for a second part but the second part is not substitutional for the first part; and
receiving second data representing two-way part substitutional relationships, wherein, in a two-way part substitutional relationship, a third part is substitutable for a fourth part and the fourth part is substitutional for the third part.

17. The system of claim 15 wherein the code executable by the one or more processors for generating an aftermarket supply chain, collective, part substitutional relationship network of part chain sequences is further executable by the one or more processors for:
representing the defined substitutional part relationships in a known, part substitutional relationship representation that represents a first part, an $N^{th}$ part, and intervening, substitutional parts that identifies a substitutional link that the $N^{th}$ part is a substitute for the first part because each intervening, substitutional part is a substitute for a preceding part in the defined part substitutional relationship representation, wherein N is an integer equal to at least 3.

18. The system of claim 15 wherein the code executable by the one or more processors for generating an inferred, part substitutional relationship representation using the derived missing, part substitutional links is further executable by the one or more processors for:
applying defined logic operations to infer intervening, substitutional parts that link parts in the defined part substitutional relationship representation.

19. The system of claim 15 wherein the code executable by the one or more processors for generating at least one of the inferred, part substitutional relationship and the collective, part substitutional relationship network is further executable by the one or more processors for:
optimizing at least one of the inferred, part substitutional relationship and the collective, part substitutional relationship network based on one more optimization criteria.

20. The system of claim 19 wherein the code executable by the one or more processors for optimizing at least one of the inferred, part substitutional relationship and the collective, part substitutional relationship network is further executable by the one or more processors for:
processing weights of the parts to determine a contribution of the weights of each part to each optimization criterion; and
determining at least one of the inferred, part substitutional relationship and the collective, part substitutional relationship network based on the contribution of the weights of each part which results in at least one of the inferred, part substitutional relationship and the collective, part substitutional relationship network meeting the optimization criteria.

21. The system of claim 19 wherein the optimization criteria comprises a group that includes at least one member of a group consisting of: lowest cost parts relative to all other parts in the inferred, part substitutional relationship, most expensive parts relative to all other parts in at least one of (i) the inferred, part substitutional relationship and (ii) the collective, part substitutional relationship network, most reliable parts relative to all other parts in at least one of (i) the inferred, part substitutional relationship and (ii) the collective, part substitutional relationship network, most critical parts relative to all other parts in at least one of (i) the inferred, part substitutional relationship and (ii) the collective, part substitutional relationship network, and most available parts relative to all other parts in at least one of (i) the inferred, part substitutional relationship and (ii) the collective, part substitutional relationship network.

22. The system of claim 15 wherein:
the code is further executable by the one or more processors for:
identifying conflicting relationships between parts in the defined part substitutional relationship representation;
resolving the conflicting relationships; and
finalizing the defined part substitutional relationships after resolving the conflicting relationships; and
generating the aftermarket supply chain, collective, part substitutional relationship network comprises generating the collective, part substitutional relationship network from the finalized defined part substitutional relationship representation and the inferred, part substitutional relationship representation.

23. The system of claim 15 wherein:
the code is further executable by the one or more processors for:
processing conflict resolution rules to identify conflicting relationships between parts in the inferred, part substitutional relationship representation;
resolving the conflicting relationships;
finalizing the inferred, part substitutional relationship representation after resolving the conflicting relationships; and
using the finalized part substitutional relationship representation to create multiple, unique priority sequences.

24. The system of claim 23 wherein the code executable by the one or more processors for identifying conflicting relationships between parts in the inferred, part substitutional relationship network is further executable by the one or more processors for:
identifying circular substitutional relationships and inconsistent substitutional relationships.

25. The system of claim 23 wherein the multiple, unique priority sequences comprise a consume sequence, procure sequence, and replenish sequence.

26. The system of claim 23 wherein:
the code is further executable by the one or more processors for:
providing the sequences to an order management system for the order management system to utilize substitute parts identified in the priority sequences.

27. The system of claim 15 wherein the code executable by the one or more processors receiving data from one or more data sources is further executable by the one or more processors for:
receiving data from at least two members of a group consisting of: a call center database, a warehouse shipping database, and an engineering part release database.

28. The system of claim 15 wherein:
the code is further executable by the one or more processors for:
visually displaying the inferred, part substitutional relationship representation.

* * * * *